(12) United States Patent
Nguyen et al.

(10) Patent No.: US 11,812,470 B2
(45) Date of Patent: Nov. 7, 2023

(54) RECEIVER FEEDBACK ABOUT POTENTIAL COLLISIONS

(71) Applicant: QUALCOMM Incorporated, San Diego, CA (US)

(72) Inventors: Tien Viet Nguyen, Bridgewater, NJ (US); Gabi Sarkis, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/027,645

(22) Filed: Sep. 21, 2020

(65) Prior Publication Data

US 2021/0105817 A1 Apr. 8, 2021

Related U.S. Application Data

(60) Provisional application No. 62/912,003, filed on Oct. 7, 2019.

(51) Int. Cl.
| | |
|---|---|
| *H04W 74/08* | (2009.01) |
| *H04B 17/27* | (2015.01) |
| *H04B 17/327* | (2015.01) |
| *H04W 92/18* | (2009.01) |

(52) U.S. Cl.
CPC ........ *H04W 74/0816* (2013.01); *H04B 17/27* (2015.01); *H04B 17/327* (2015.01); *H04W 92/18* (2013.01)

(58) Field of Classification Search
None
See application file for complete search history.

(56) References Cited

U.S. PATENT DOCUMENTS

| | | | |
|---|---|---|---|
| 2016/0338103 A1* | 11/2016 | Martin | H04W 74/08 |
| 2018/0367999 A1* | 12/2018 | Barberis | H04W 16/10 |
| 2019/0306835 A1 | 10/2019 | Hoang et al. | |
| 2020/0068609 A1* | 2/2020 | Wang | H04W 72/0446 |
| 2020/0396719 A1* | 12/2020 | Sheu | H04W 72/042 |
| 2021/0051525 A1* | 2/2021 | Cao | H04W 72/0446 |
| 2021/0058905 A1* | 2/2021 | Ganesan | H04L 1/1685 |

(Continued)

FOREIGN PATENT DOCUMENTS

| | | |
|---|---|---|
| CN | 107241804 A | 10/2017 |
| WO | 2018201784 A1 | 11/2018 |

OTHER PUBLICATIONS

International Search Report and Written Opinion—PCT/US2020/051993—ISA/EPO—dated Dec. 4, 2020.

(Continued)

*Primary Examiner* — Chae S Lee
(74) *Attorney, Agent, or Firm* — Arent Fox, LLP

(57) ABSTRACT

A receiving device identifies a collision between first resources reserved by a first transmitting device and second resources reserved by a second transmitting device and transmits a collision indication to the first transmitting device or the second transmitting device based on the identified collision. A transmitting device that receives a collision indication from the receiving device backs off from transmitting during the resources received by the resource reservation in response to receiving the collision indication from the receiving device.

37 Claims, 11 Drawing Sheets

(56) References Cited

U.S. PATENT DOCUMENTS

2021/0250117 A1\* 8/2021 Homchaudhuri ....... H04L 47/25
2022/0030598 A1 1/2022 Li
2022/0116917 A1 4/2022 Zhao et al.

OTHER PUBLICATIONS

Mediatek Inc: "On In-Device Coexistence Between LTE and NR Sidelinks", 3GPP Draft, R1-1906557, 3GPP TSG RAN1 WG1 Meeting #97, On In-Device Coexistence Between LTE and NR Sidelinks, 3rd Generation Partnership Project (3GPP), Mobile Competence Centre, 650, Route Des Lucioles, F-06921 Sophia-Antipolis C, vol. Ran WG1, io. Reno, USA, May 13-17, 2019, May 4, 2019 (May 4, 2019), XP051708593, 7 Pages.
Item 2 Continued: Retrieved from the Internet: URL:http://www.3gpp.org/ftp/tsg%5Fran/WG1%5FRL1/TSGR1%5F97/Docs/R1%2D1906557%2Ezip [retrieved on Apr. 9, 2019] the Whole Document.

TCL Communication: "Resource Allocation for NR Sidelink Mode 2", 3GPP Draft, 3GPP TSG RAN1 WG1 Meeting #98bis, R1-1910411_RAN1_NR-V2X_Resource Alloc_Mode 2, 3rd Generation Partnership Project (3GPP), Mobile Competence Centre, 650, Route Des Lucioles, F-06921, Sophia-Antipolis Cedex, France vol. Ran WG1, No. Chongqing, CN, Oct. 14-20, 2019, Oct. 4, 2019 (Oct. 4, 2019), XP051808185, pp. 1-8,.
Item 4 Continued: Retrieved from the Internet: URL:https://ftp.3gpp.org/tsg_ran/WG1_RL1/TSGR1_98b/Docs/R1-1910411.zip R1-1910411_ran1_nr-v2x_resource_alloc_mode2.pdf [retrieved on Oct. 4, 2019] Preemption Indication On Sidelink Channels, p. 6-p. 7.
Interdigital: "NR Sidelink Resource Allocation Mechanism for Mode 2", 3GPP TSG RAN WG1 #98, R1-1909030, 3GPP, Mobile Competence Centre, 650, Route Des Lucioles, F-06921, Sophia-Antipolis Cedex, France, vol. RAN WG1, No. Prague, Czech, Aug. 26, 2019-Aug. 30, 2019, Aug. 16, 2019, XP051765634, 6 pages, paragraph [02. 3]—paragraph [02 .4], sections 2. 1—2.2.

\* cited by examiner

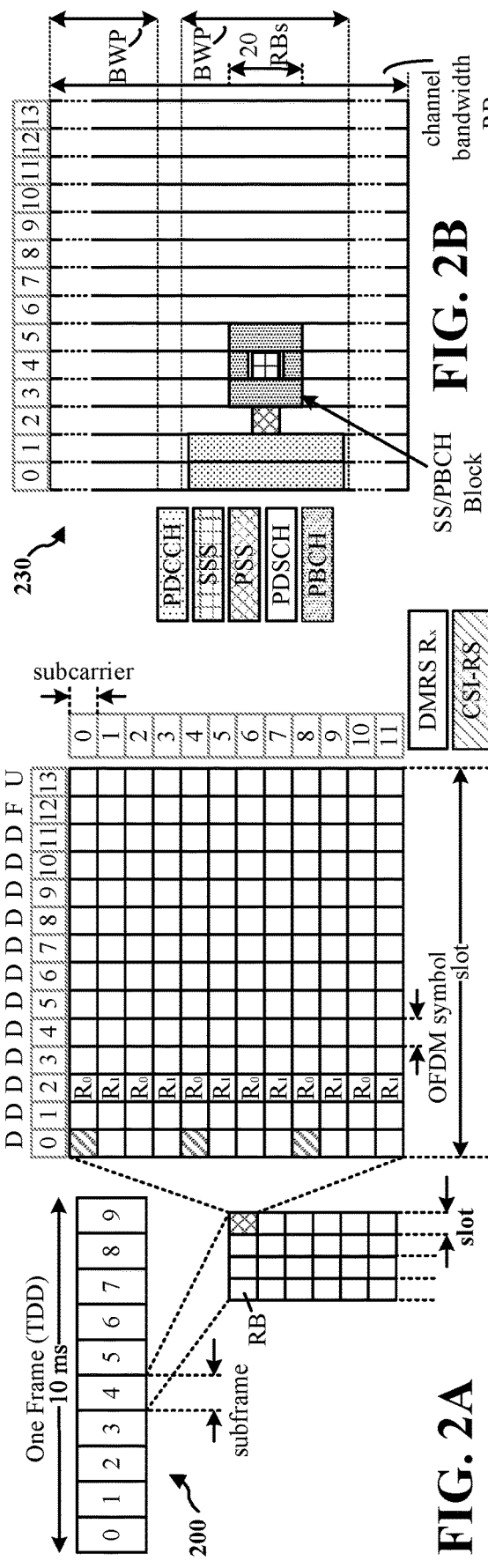
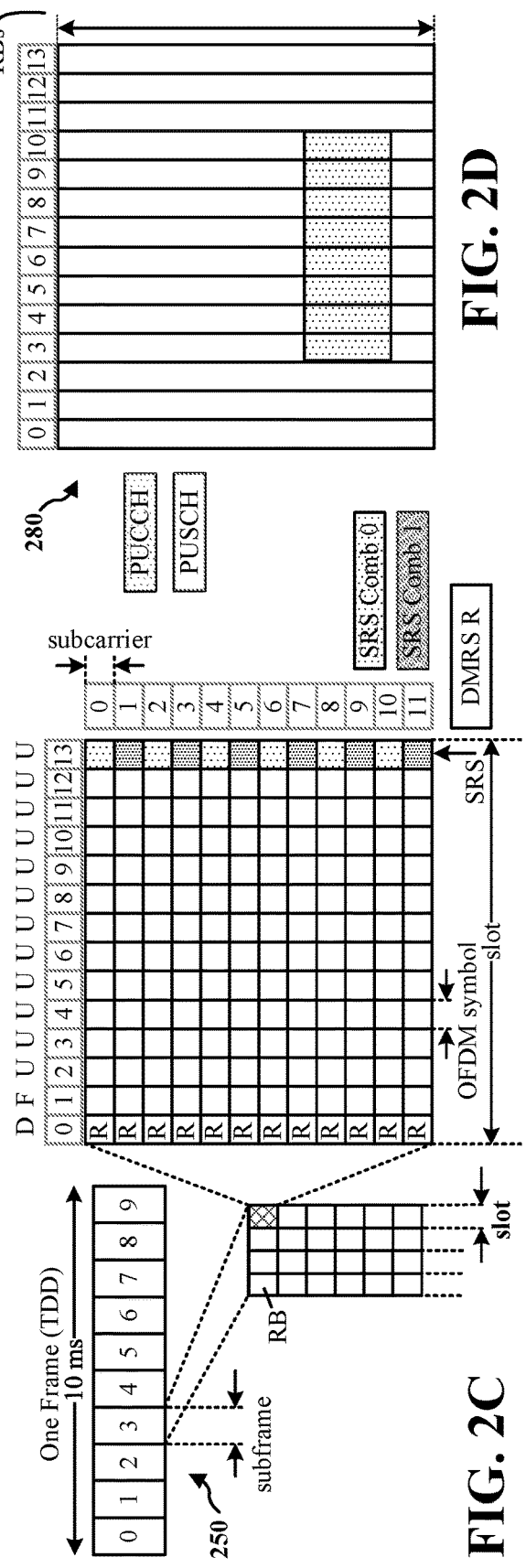
FIG. 2A
FIG. 2B
FIG. 2C
FIG. 2D

RECEIVER FEEDBACK ABOUT POTENTIAL COLLISIONS

CROSS REFERENCE TO RELATED APPLICATION(S)

This application claims the benefit of U.S. Provisional Application Ser. No. 62/912,003, entitled "RECEIVER FEEDBACK ABOUT POTENTIAL COLLISIONS" and filed on Oct. 7, 2019, the disclosure of which is expressly incorporated by reference herein in its entirety.

BACKGROUND

Technical Field

The present disclosure generally relates to communication systems, and more particularly, to user equipments configured to communicate information indicating potential collisions on sets of resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-anything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some wireless communications environments, a transmitting device, such as a user equipment (UE), and a receiving device, such as another UE, may communicate using multiple packets that are transmitted over the air. The transmitting device may transmit each of the packets multiple times in order to reserve a set of resources. For example, the transmitting device may transmit a transmission reserving resources for a first transmission, the first transmission of the packet may reserve resources for the next transmission of the packet, and so forth.

When other devices, such as other UEs, receive transmissions reserving resources, the other devices may refrain from transmitting on the reserved resources reserved. For example, the other UEs may back off or delay transmitting on resources for the duration of the reservation. By refraining from transmitting on reserved resources, interference experienced by receiving devices can be reduced.

In some aspects, a transmitting device may retransmit a packet if an intended receiver did not correctly receive the packet. For example, if an intended receiver responds with a non-acknowledgement (NACK), the transmitting device may determine to retransmit the packet. However, if the transmitting device does not receive a NACK from any of the intended receivers, the transmitting device may determine that a retransmission of the packet is not needed and may refrain from retransmitting the packet.

Potentially, other devices that avoid transmitting on resources reserved by the transmitting device may also monitor for a NACK from the intended receiver(s) of the transmitting device. If one of the other devices detects a NACK from an intended receiver of the transmitting device, the one of the other devices may avoid using the resources reserved for the retransmission. However, if a NACK from the intended receiver(s) of the transmitting device is not detected, the one of the other devices may determine that the reserved resources will not be used by the transmitting device for a retransmission, and therefore, the one of the other devices may use the reserved resources to transmit communication.

In some situations, the reservation of resources may not fully avoid collisions between transmissions. For example, two devices may reserve resources at the same time. One or both of the two devices may be unaware of the other reservation and may transmit in an overlapping manner that interferes with the transmission of the other device. For example, one transmitting device may be a hidden node for the other device and therefore may be an interfering device. The interfering device may be outside of a link budget range of the control transmissions for the other transmitting device when the other transmitting device transmits a reservation, but the interfering device may still transmit with a power sufficient to disrupt reception at an intended receiver(s).

The present disclosure describes various techniques and approaches to reduce the amount and/or mitigate the effects of interfering transmissions based on identifying overlapping reservations between two transmitting devices. Various aspects described herein enable receiving devices to determine which of two or more potentially colliding transmissions should proceed (and by extension, which of the two or more potentially colliding transmissions should be backed off). In some aspects, if multiple receiving devices are affected by a potential collision, each of the receiving devices may identify the same transmitting device that should be informed about the collision, such as by applying a global rule.

In a first aspect of the disclosure, a first method, a first computer-readable medium, and a first apparatus are provided. The first apparatus may be a receiving device. The first apparatus may identify a collision between first resources reserved by a first transmitting device and second resources reserved by a second transmitting device. The first apparatus may then transmit a collision indication to the first transmitting device or the second transmitting device based on the identified collision.

In a second aspect of the disclosure, a second method, a second computer-readable medium, and a second apparatus are provided. The second apparatus may be a transmitting device. The second apparatus may transmit a resource reservation for a transmission from the transmitting device to at least one receiving device. The second apparatus may receive a collision indication from a receiving device of the at least one receiving device for a collision between resources reserved by the resource reservation and resources reserved by another transmitting device. The transmitting device may then back off from transmitting on the resources reserved by the resource reservation in response to receiving the collision indication from the receiving device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
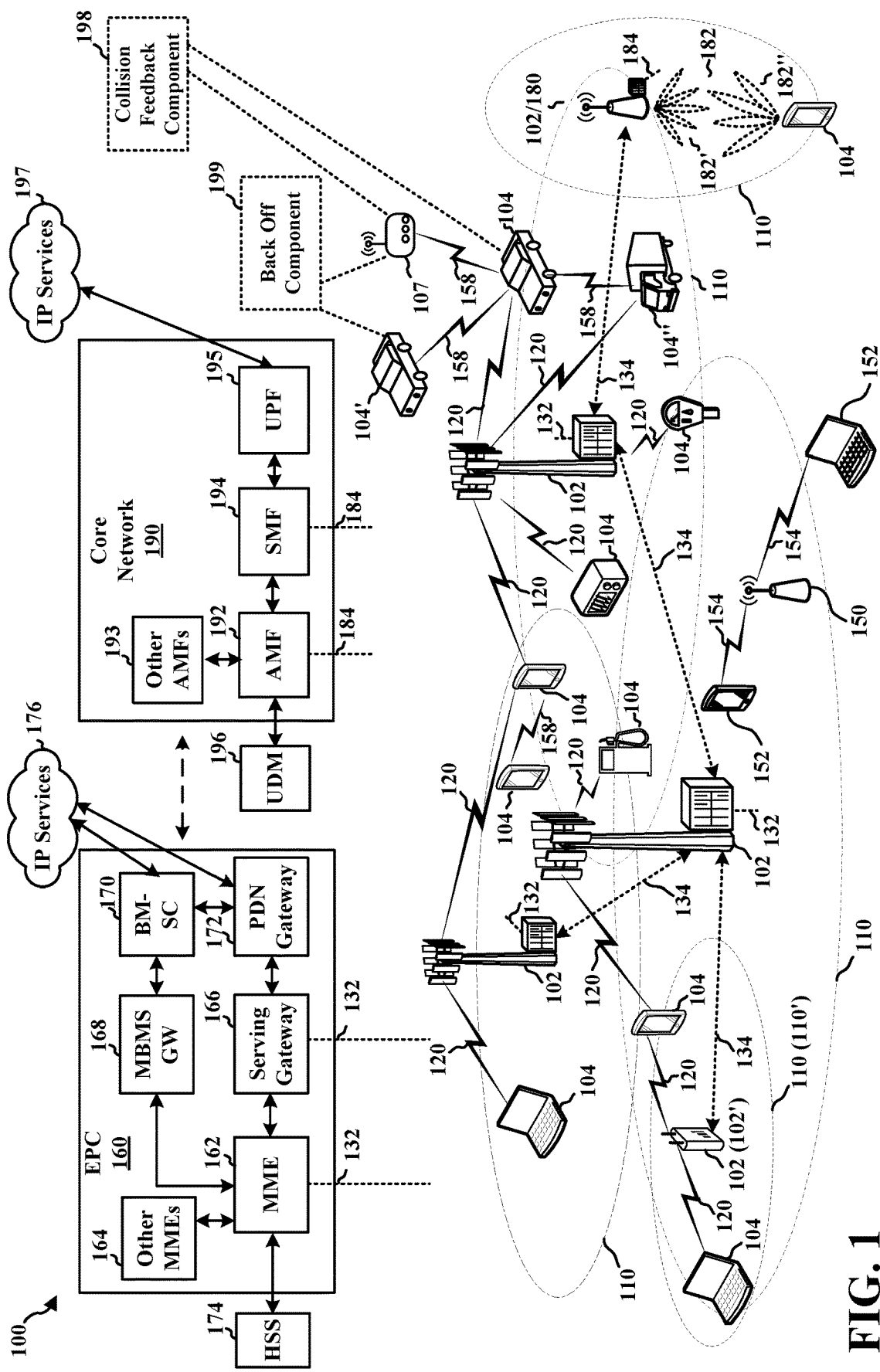
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network.

A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Further, although the present disclosure may focus on vehicle-to-vehicle (V2V) communication, the concepts and various aspects described herein may be applicable to other similar areas, such as D2D communication, IoT communication, vehicle-to-anything (V2X) communication, or other standards/protocols for communication in wireless/access networks.

Some wireless communication networks may include vehicle-based communication devices that can communicate from V2V, vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as V2X communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D may also be transmitted and received by other transmitting and receiving devices, such as RSU 107, etc. Aspects of the communication may be based on PC5 or sidelink communication, e.g., as described in connection with the example in FIG. 2.

Referring again to FIG. 1, in certain aspects, a receiving device, such as a UE 104 and/or RSU 107, may include a collision feedback component 198 configured to identify a collision between first resources reserved by a first transmitting device (e.g., UE 104') and second resources reserved by a second transmitting device (e.g., UE 104"). The collision feedback component 198 of the receiving device (e.g., UE 104 and/or RSU 107) may then transmit a collision indication to the first transmitting device (e.g., UE 104') or the second transmitting device (e.g., UE 104") based on the identified collision.

In certain other aspects, a transmitting device (e.g., the UE 104' and/or RSU 107) may transmit a resource reservation for a transmission from the transmitting device to at least one receiving device (e.g., the UE 104 and/or RSU 107). The transmitting device may include a back off component 199 configured to receive a collision indication from one of the at least one receiving device. In response to receiving the collision indication, the back off component 199 may configure the transmitting device to back off from transmitting during resources reserved by the resource reservation. Although only the UE 104 and RSU 107 are illustrated as having a collision feedback component 198, and only the UE 104' and RSU 107 are illustrated as having a back off component 199, any UE (and/or any device configured for D2D communication) may include one or more components similar to the collision feedback component 198 and/or the back off component 199.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
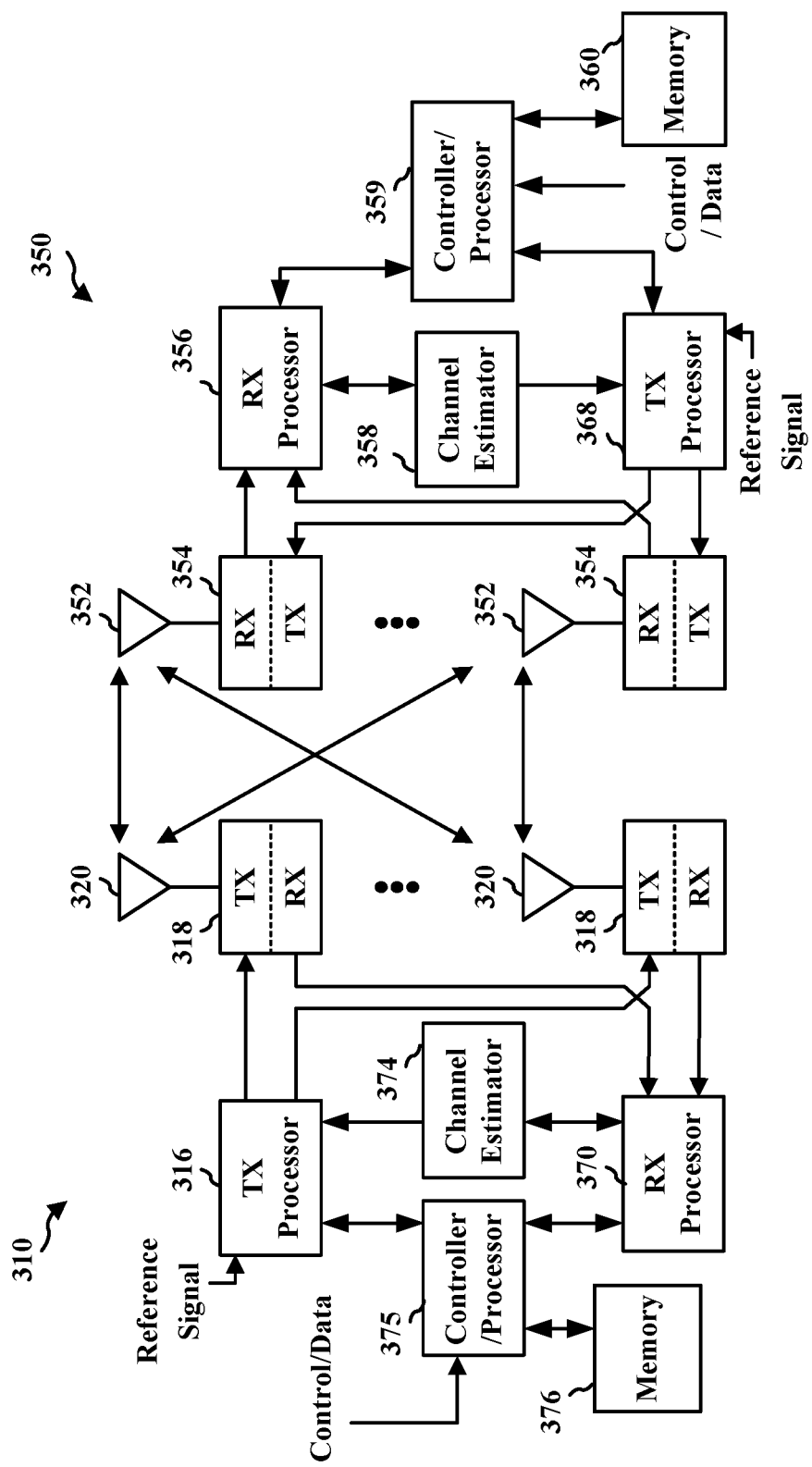
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with 198 of FIG. 1.

In some other aspects, at least one of the TX processor 368, the RX processor 356, and the controller/processor 359 may be configured to perform aspects in connection with 199 of FIG. 1.

Figure 4:
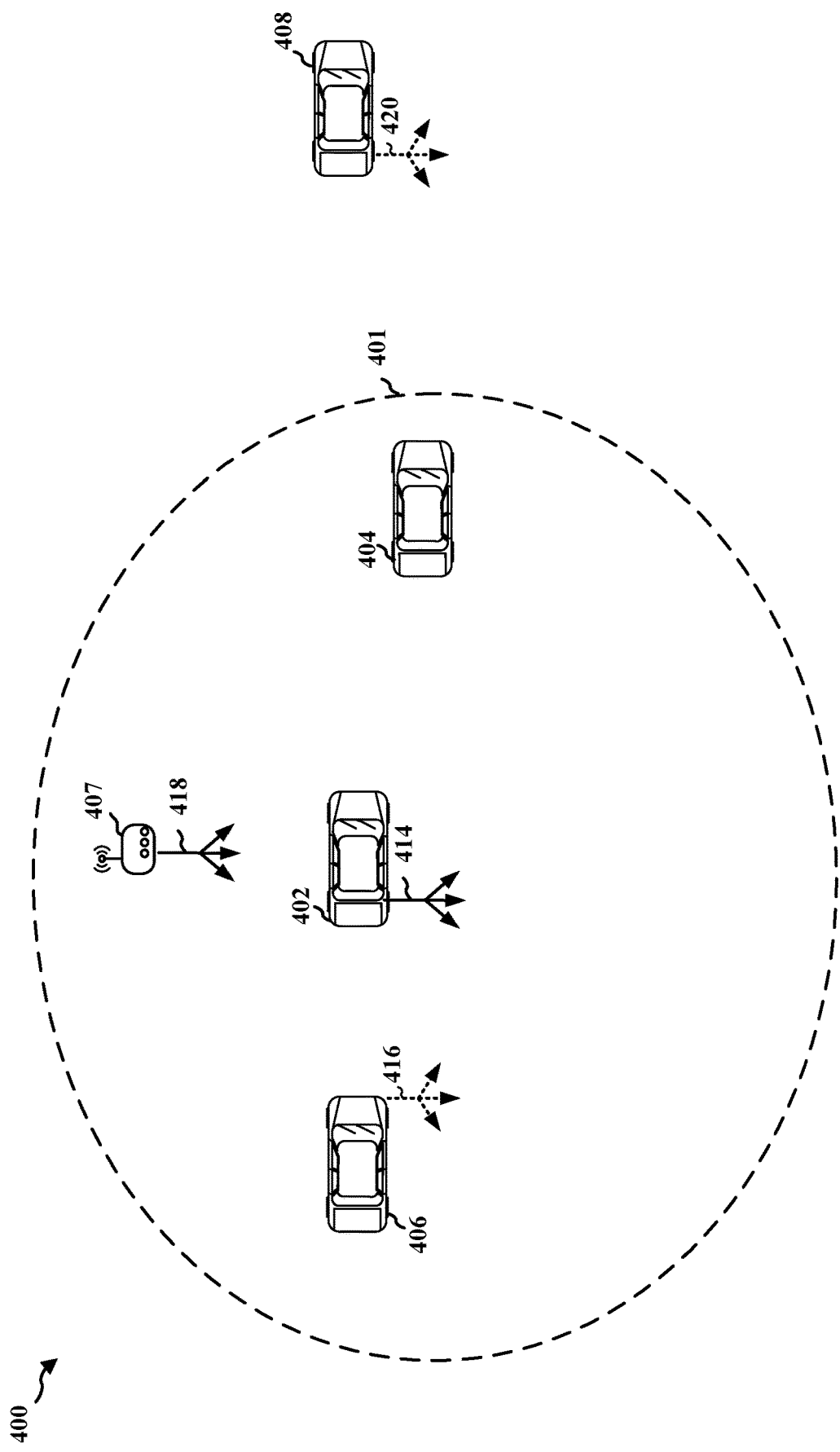
FIG. 4 is a diagram illustrating an example of devices involved in wireless communication.

FIG. 4 illustrates an example 400 of wireless communication between devices based on V2X and/or other D2D communication. The communication may be based on a slot structure including aspects described in connection with FIG. 2, supra. For example, a transmitting UE 402 may transmit a transmission 414, e.g., including control information and/or data on a control channel and/or a corresponding data channel. The transmission 414 may be intended (e.g., addressed) for a set of receiving UEs 404, 406, and 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device.

The UEs 402, 404, 406, and 408 may each be capable of operating as a transmitting device in addition to operating as a receiving device. Thus, the UEs 406, 408 are illustrated as transmitting the transmissions 416 and 420. The transmissions 414, 416, and 420 may be broadcast or multicast to nearby devices. For example, the UE 404 may transmit communication intended to be received by other UEs within a range 401 of the UE 404. In some aspects, a RSC 407 may receive communication from and/or transmit communication to one or more of the UEs 402, 404, 406, and 408.

A transmitting device, such as the UE 402, may transmit each packet multiple times. For example, the UE 402 may send a transmission reserving resources for a first transmission. The first transmission of the packet may reserve resources for the next transmission of the packet. Other devices, such as the UE 404 and 406 and the RSC 407 may avoid transmitting using the resources reserved by the UE 402. By avoiding the resources reserved for transmission by other devices, the interference experienced by the receiving devices can be reduced.

In some aspects, the transmitting UE 402 may retransmit the packet only if an intended receiver did not correctly receive the packet. For example, if the receiving UE 404 responds to the transmitting UE 402 with a NACK (e.g., based on failing to correctly receive the packet), the transmitting UE 104 may determine to retransmit the packet. However, if the UE 402 does not receive a NACK from any of the intended receivers, the UE 402 may determine that a retransmission of the packet is not needed and may refrain from retransmitting the packet.

Further, other devices that are avoiding transmitting on the reserved resources of the UE 402 may also monitor for a NACK from the intended receivers of the UE 402. If another device detects a NACK from an intended receiver of the UE 402, the other device may avoid using the resources reserved for the retransmission. If the other device does not detect a NACK from the intended receiver(s) of the UE 402, the other device may determine that the reserved resources will not be used by the UE 402 for a retransmission and the other device may use the reserved resources to transmit communication.

In some situations, the reservation of resources may not fully avoid collisions between transmissions. For example, two devices may reserve resources at the same time. The two devices may not be aware of the other reservation and may transmit in an overlapping manner that interferes with the transmission of the other device. For example, one transmitting device may be a hidden node for the other device. Illustratively, an interfering device may be outside of a link budget range of the control transmissions for the transmitting UE 402 when the UE 402 transmits a reservation, but the interfering device may still transmit with a sufficiently strong enough transmission to disrupt reception at a receiver. For example, if the UE 408 transmits a resource reservation and the UE 402 transmits a resource reservation, the two UEs may unaware of the potential collision because the UE 408 is outside of the range 401 of the UE 402. However, the transmissions from UE 402 may collide with the transmissions from the UE 408 when received by the UE 404.

Figure 5:
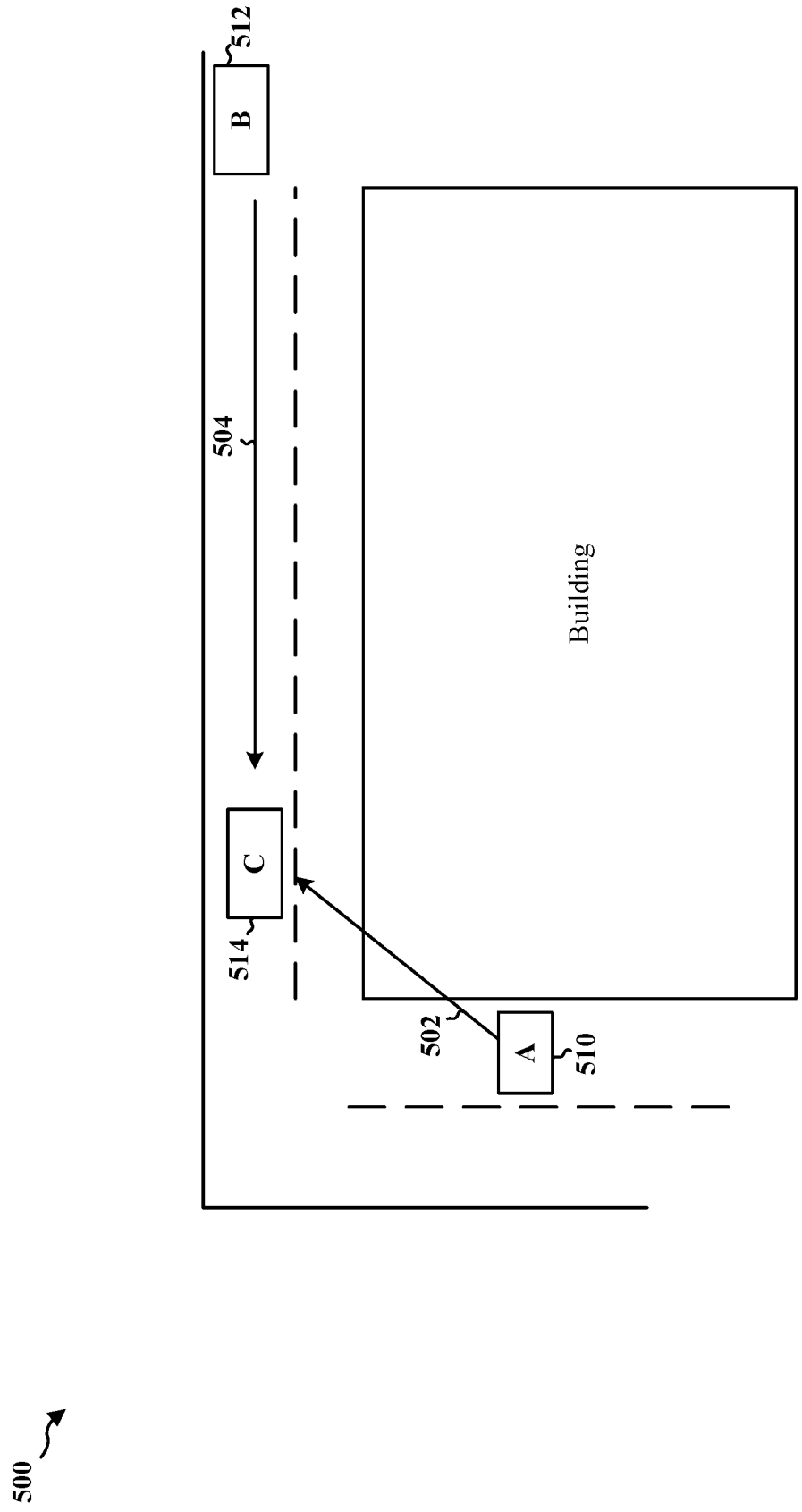
FIG. 5 is a diagram illustrating an example of devices involved in wireless communication including a line of sight condition and a non-line of sight condition.

FIG. 5 illustrates a diagram showing an example of a hidden node scenario 500. In FIG. 5, device A 510 is traveling on a first road and devices B 512 and C 514 are on a second road. Device B 512 may be outside of a protected radius, e.g., an intended range, of device A 510. Therefore, the same time and frequency resources may be used for transmissions by device A 510 and device B 512. Device C 514 may be an intended receiver for transmissions 502 from device A 510. However, the signal from device A 510 to device C 514 may be weak, because the channel is a non-line of sight (NLOS) channel. In contrast, interference that device B 512 experiences due to transmission 504 device C 514 may be substantial, e.g., because there is a line of sight (LOS) condition for devices B 512 and C 514. As a result, device C 514 may be unable to correctly receive and decode the transmission 502 from device A 510.

Figure 6:
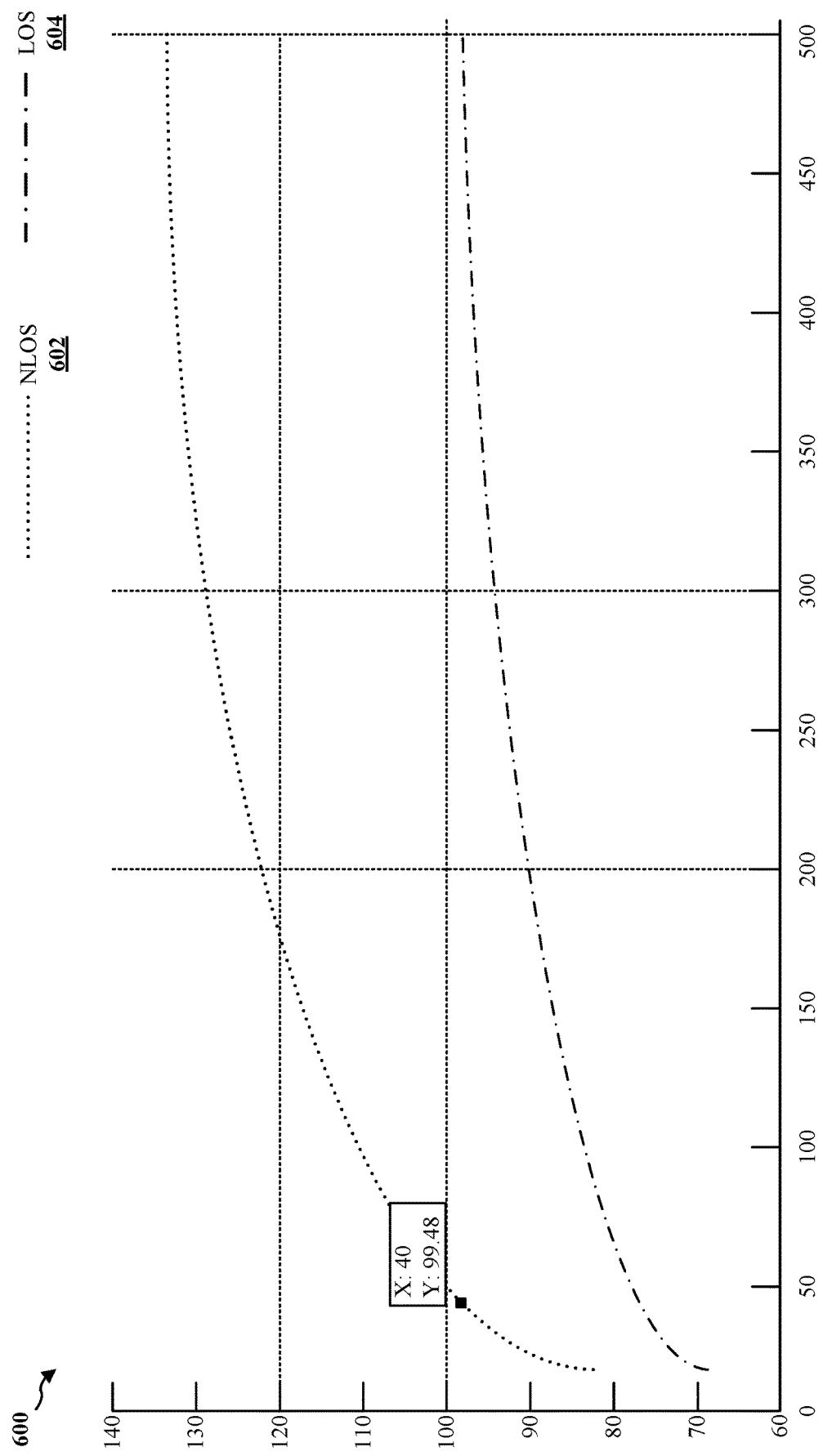
FIG. 6 is a graph showing example pathloss for vehicle-to-anything (V2X) communication over a distance.

Relatedly, FIG. 6 is a graph showing a comparison for pathloss 602 over a distance for NLOS communication and pathloss 604 over a distance for LOS communication. Illustratively, if a pathloss of less than 100 decibels (dB) is considered acceptable for communication between two devices based on V2X or other D2D communication, in an NLOS situation, the pathloss 602 is already at 100 dB when a distance of 50 meters is reached. In contrast, an LOS condition may not reach a similar level of pathloss 604 until a distance of 500 meters. In the context of FIG. 5, device B 512 may interfere with reception of transmission 502 by device C 514 from device A 510 even at a large distance.

The present disclosure provides various techniques and approaches to reducing interfering transmissions based on overlapping reservations between two or more transmitting devices by a receiving device (e.g., UE 404 in FIG. 4, device C in FIG. 5, etc.) sending a collision indication to one of the transmitting devices. In response to receiving the collision indication, one of the transmitting devices may back off from transmitting on the resources indicated by the respective reservation. For example, in FIG. 4, the receiving UE 404 may send a collision indication to either the transmitting UE 402 or the transmitting UE 408 to inform that transmitting UE that the resources are reserved, and that transmitting UE is not clear to send (CTS) a transmission on the reserved resources. In FIG. 5, for example, the device C 514 may end an indication to either device A 510 or Device B 512 with a such a collision indication.

According to some aspects, a receiving device may determine that a collision between reserved resources will occur if the reserved resources at least partially overlap; that is, the resources reserved by two transmitted devices occur on at least some of the same time/frequency resources. The receiving device may also consider a measurement of the signals from the two transmitting devices. For example, the receiving device may determine a collision if a difference between the measurements for the signals from the two transmitting devices is within a threshold level and/or within a range, such a preconfigured threshold level and/or preconfigured range. The measurements may include, for example, reference signal receive power (RSRP), signal-to-noise ratio (SNR), signal-to-interference-plus-noise ratio (SINR), reference signal receive quality (RSRQ), and/or another similar measurement. In some aspects, the receiving device may base the determination on a distance between the receiving device and each of the transmitting devices (e.g., the distance between device C 514 and device A 510, as well as the distance between device C 514 and device B 512). In some further aspects, the receiving device may base the determination on a distance between the two transmitting devices (e.g., the distance between device A 510 and device B 512).

The receiving device may inform either device A or device B of the potential collision. The transmitting device that receives the indication may back off and refrain from transmitting using the reserved resources. If the receiving device transmitted the collision indication to both transmitting devices, it may lead to a waste of resources because both transmitting devices may back off and avoid using the reserved resources. Additionally, the transmitting devices may attempt to reserve later resources to transmit the message, which may lead to another collision. Therefore, by transmitting a collision indication to one of the transmitting devices, the receiving device facilitates interference reduction while enabling the other transmission to continue.

Aspects presented herein enable receiving devices to determine which of the colliding transmissions should proceed in a uniform manner. Therefore, if there are multiple receiving devices affected by the potential collision, each of the receiving UEs may identify the same transmitting device that should be informed about the collision. Therefore, a global rule may be applied by receiving devices to determine which transmitting device to inform about the collision.

Figure 7:
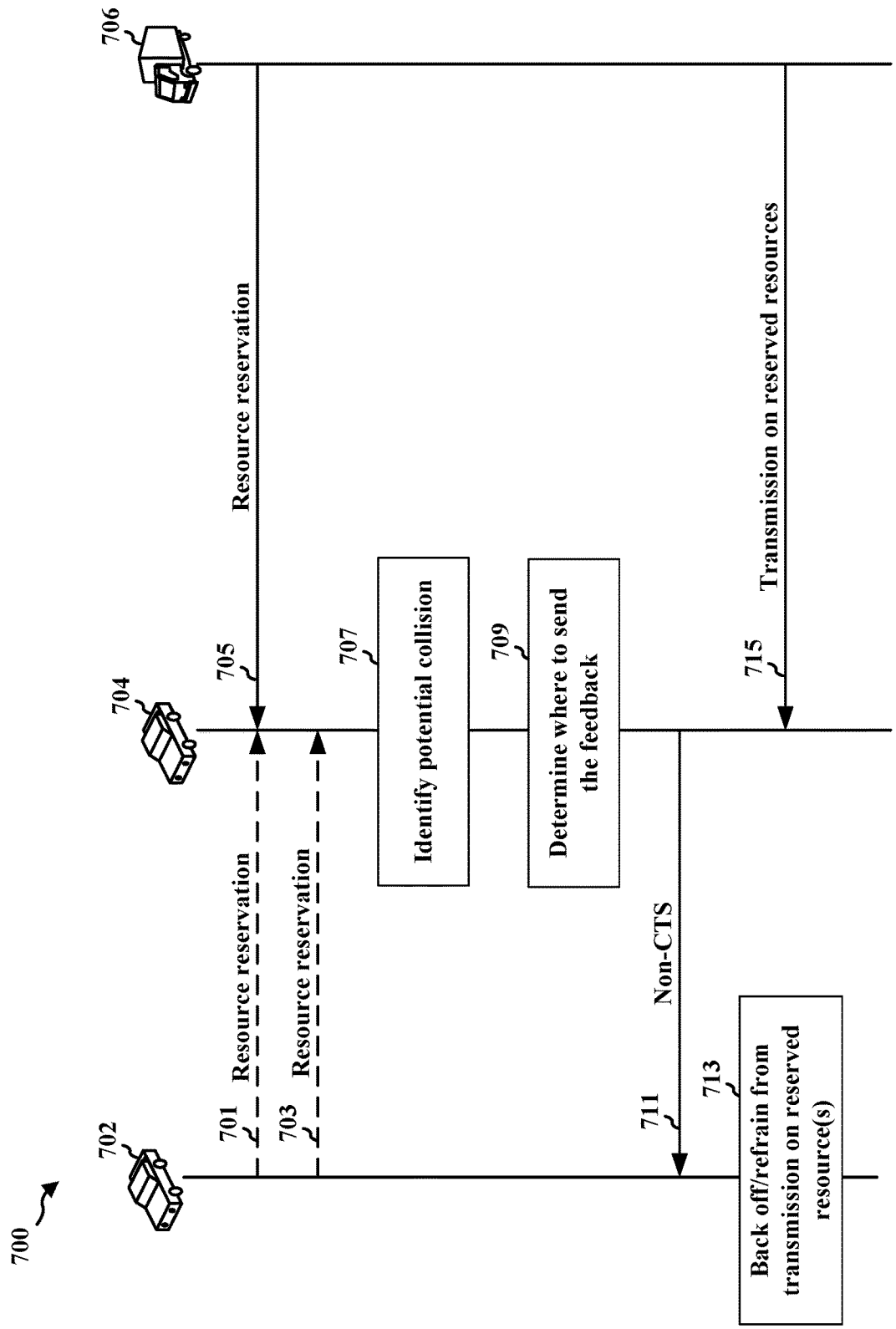
FIG. 7 is a call flow diagram illustrating an example communication flow between devices.

FIG. 7 is a call flow diagram illustrating an example communication flow 700 between a device 704 and two transmitting devices 702, 706. Although the device 704 may be referred to as a receiving device, the device may be capable of both transmission and reception. Similarly, the transmitting devices 702, 706 may operate at times as receiving devices. The receiving device 704 may receive resource reservation 701 and/or resource reservation 703 from the first transmitting device 702, and may further receive another resource reservation 705 from the second transmitting device 706.

The receiving device 704 may perform an identification 707 of a potential collision between the resources reserved by the first and second transmitting devices 702, 706 based on at least one of the resource reservations 701, 703 from the first transmitting device 702 and the resource reservation 705 from the second transmitting device 706. In some aspects, the receiving device 704 may base such identification 707 on an overlap in the time/frequency of the resources scheduled by the first and second transmitting devices 702, 706. For example, the receiving device 704 may identify a first set of time/frequency resources included in one of the resource reservations 701, 703 and/or may identify a second set of time/frequency resources included in the other of the resource reservations 701, 703 received from the first transmitting device 702. Further, the receiving device 704 may identify a third set of time/frequency resources included in the resource reservation 705 received from the second transmitting device 706. The receiving device 704 may then compare the first and/or second sets of time/frequency resources to the third set of time/frequency resources, and the receiving device 704 may determine whether the first and/or second sets of time/frequency resources at least partially overlap with the third set of time/frequency resources. The receiving device 704 may then make the identification 707 of the potential collision when the receiving device 704 determines that the first and/or second sets of time/frequency resources at least partially overlap (e.g., in both time and frequency).

Additionally or alternatively, the receiving device 704 may base such identification 707 on a difference in channel quality values (e.g., RSRPs, SNRs, SINRs, RSRQs, etc.) measured between at least one of the resource reservations 701, 703 from the first transmitting device 702 and the resource reservation 705 from the second transmitting device 706. For example, the receiving device 704 may measure a first channel quality value based on receiving one of the resource reservations 701, 703 and may measure a second channel quality value based on receiving the other of the resource reservations 701, 703 from the first transmitting device 702. The receiving device 704 may then measure a third channel quality value based on receiving the resource reservation 705 from the second transmitting device 706. The receiving device 704 may compare the first and/or second channel quality values to the third channel quality value, e.g., in order to determine a difference. Subsequently, the receiving device 704 may compare the difference(s) to a channel quality threshold and/or may determine whether the difference(s) falls within a channel quality range. The receiving device 704 may then make the identification 707 of the potential collision when the receiving device 704 determines that the difference(s) satisfies the channel quality threshold and/or is within the channel quality range.

Additionally or alternatively, the receiving device 704 may base such identification on a first distance between the first transmitting device 702 and the receiving device 704 and a second distance between the second transmitting device 706 and the receiving device 704. For example, the receiving device 704 may measure a first distance between the receiving device 704 and the first transmitting device 702 (e.g., based on receiving one of the resource reservations 701, 703 from the first transmitting device 702). The receiving device 704 may then measure a second distance between the receiving device 704 and the second transmitting device (e.g., based on receiving the resource reservation 705 from the second transmitting device 706). The receiving device 704 may compare the first distance to the second distance, e.g., in order to determine a difference. Subsequently, the receiving device 704 may compare the difference to a first distance threshold and/or may determine whether the difference falls within a first distance range. The receiving device 704 may then make the identification 707 of the potential collision when the receiving device 704 determines that the difference satisfies the first distance threshold and/or fall within the first distance range.

Additionally or alternatively, the receiving device 704 may base such identification on a distance between the first transmitting device 702 and the second transmitting device 706. For example, the receiving device 704 may measure a distance between the first transmitting device 702 and the second transmitting device (e.g., based on receiving one of the resource reservations 701, 703 from the first transmitting device 702 and further based on receiving the resource reservation 705 from the second transmitting device 706). Subsequently, the receiving device 704 may compare the distance to a second distance threshold and/or may determine whether the difference falls within a second distance range. The receiving device 704 may then make the identification 707 of the potential collision when the receiving device 704 determines that the distance satisfies the second distance threshold and/or fall within the second distance range.

Based upon the identification 707 of the potential collision, the receiving device 704 may make a determination 709 of where to send the feedback about the collision, which may be based on one or more rules, e.g., as further described herein. In other words, the receiving device 704 may determine which of the transmitting devices 702, 706 should be informed about the identified collision. The receiving device 704 may generate the collision indication as a non-CTS 711, which may indicate that the channel is not clear to send a transmission.

In some aspects, the receiving device 704 may transmit an indication (e.g., included in the non-CTS 711) to the one of the transmitting devices 702, 706 that indicates the resource reservation at a later time. For example, if the second transmitting device 706 sends the resource reservation 705 and the first transmitting device 702 sends the second resource reservation 703 (at least partially overlapping with the resource reservation 705) after the second transmitting device 706 sends the resource reservation 705, the receiving device 704 may send the non-CTS 711 to the first transmitting device 702. The determination of the later reservation may be based on signal arrival time at the receiving device 704. Therefore, whichever resource reservation signal arrives later at the receiving device 704 may be identified as the transmitting device that is not clear to send the transmission or that should be informed about the collision.

If the resource reservation signals arrive at the receiving device 704 at the same time, e.g., if the transmitting device 702 sends resource reservation 701, then the receiving device 704 may send the indication to the first transmitting device 702 having the resource reservation 701 associated with a lower priority than the priority of the resource reservation 705 from the second transmitting device 706. A respective priority may be based on the priority of the communication to be transmitted. The priority level may be based on a respective QoS and/or 5G QoS identifier (5QI) for the respective communication, which potentially may be indicated by each of the resource reservations 701, 703, 705.

If the resource reservations 701, 705 arrive at the receiving device 704 at the same time and the transmitting devices 702, 706 have the same priority, the receiving device 704 may make the determination 709 based on the resources reserved by the transmitting devices 702, 706 according to the resource reservations 701, 705. For example, the receiving device 704 may use a starting RB and/or an ending RB of the two sets of reserved resources to determine which of the two transmitting devices 702, 706 should receive the non-CTS 711. For example, the receiving device 704 may determine that the non-CTS 711 should be transmitted to the one of the transmitting devices 702, 706 reserving a latest starting RB. However, if the two sets of reserved resources have the same starting RB, the receiving device 704 may determine that the non-CT S should be sent to the one of the transmitting devices 702, 706 that reserves a latest ending RB of the two sets of reserved resources.

If the resource reservation signals arrive at the receiving device 704 at the same time, the transmitting devices have the same priority, and the reserved resources correspond to the same resource blocks, the receiving device may use a respective device identifier (ID) (e.g., UE ID) of the transmitting devices 702, 706 to determine the one of the transmitting devices 702, 706 that should receive the non-CTS 711. The resource reservations 701, 705 may be considered to arrive at the receiving device 704 at same time if the resource reservations 701, 705 arrive within a threshold time of each other or if the receiving device 704 is unable to determine which of the resource reservations 701, 705 was sent first.

If the resource reservation signals arrive at the receiving device 704 at the same time, the transmitting devices 702, 706 have the same priority, and the reserved resources correspond to the same resource blocks, and the device IDs correspond, the receiving device 704 may randomly select the transmitting device that should back off from transmitting.

Upon making the determination 709 of which of the transmitting devices 702, 706 is to receive the non-CTS 711, the receiving device 704 may send an indication to the determined transmitting device. For example, in FIG. 7, the receiving device 704 makes a determination 709 to send the collision feedback to the first transmitting device 702; therefore, the receiving device 704 may transmit the non-CTS 711 to the first transmitting device 702. The non-CTS 711 may indicate the collision, may inform the transmitting device 702 that the transmitting device is not clear to send, may indicate the first transmitting device 702 should back off from transmitting, etc. In response, the transmitting device 702 may refrain 713 from transmitting using the reserved resources indicated in the first or the second resource reservation 701, 703 (e.g., the non-CTS 711 may indicate on which resources to refrain from transmitting).

The non-CTS 711 may be sent by the receiving device 704 using a common resource. The common resource may enable the transmitting devices 702, 706 to be aware of the resources to monitor for such non-CTSs and/or other collision indications. The non-CTS 711 may be transmitted in a single frequency network manner, which may increase the chance of reception. The common resource may be a resource that is reserved by the transmitting devices 702, 706 for such non-CTSs and/or other collision indications. For example, at least one of the transmitting devices 702, 706 may transmit information that indicates, to the receiving device 704, the resources to use to send feedback about whether a transmitting device may continue to transmit using the reserved resources and/or whether a transmitting device should back off. In some aspects, the common resource may be indicated in one of the resource reservations 701, 703, 705. Alternatively, the receiving device 704 may send the indication as feedback on a feedback channel, such as a physical sidelink feedback channel (PSFCH). For example, for a groupcast, an acknowledgement sequence may be used to indicate a collision between reserved resources and/or a non-CTS.

Based upon receiving the non-CTS 711, the first transmitting device 702 may refrain 713, or back off, from using the reserved resources to transmit communication. Therefore, the first transmitting device 702 may refrain from transmitting during the resources indicated in at least one of the resource reservations 701, 703. The second transmitting device 706, which does not receive any feedback from the receiving device 704 indicating that a non-CTS or collision, may proceed with a transmission 715 using the resources reserved by the resource reservation 705.

Figure 8:
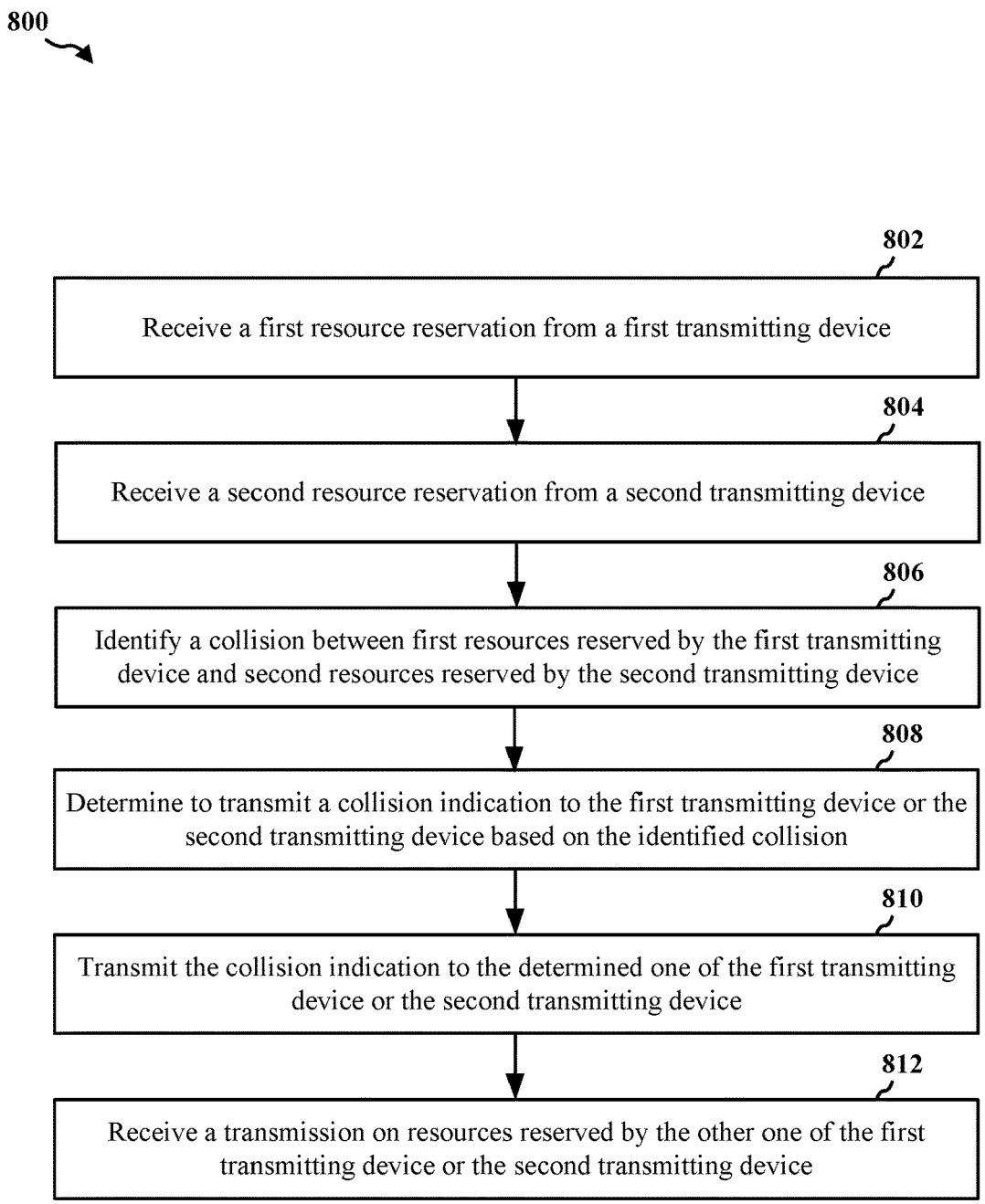
FIG. 8 is a flowchart of a method of wireless communication by a receiving device.

FIG. 8 is a flowchart of a method 800 of wireless communication. The method 800 may be performed by a UE, receiving device, and/or other apparatus (e.g., UE 104, 350, 404; receiving device 514, 704; RSC 107, 407; apparatus 1002). According to various aspects, one or more of the illustrated operations may be omitted, transposed, and/or contemporaneously performed.

At 802, the receiving device receives a first resource reservation from a first transmitting device. In some aspects, the first resource reservation may include information indicating a priority, such as a QoS and/or 5QI. In some other aspects, the first resource reservation may indicate at least one resource associated with collision indication, such as at least one feedback resource and/or at least one common resource. The at least one resource may be on a feedback channel (e.g., PSFCH) and/or may be on a common channel, groupcast channel, and/or broadcast channel.

For example, referring to FIG. 4, the receiving UE 404 and/or RSC 407 may receive a first resource reservation from the transmitting UE 402. Referring to FIG. 5, the device C 514 may receive a resource reservation from device A 510. Referring to FIG. 7, the receiving device 704 may receive the first and/or second resource reservation(s) 701, 703 from the first transmitting device 702.

At 804, the receiving device receives a second resource reservation from a second transmitting device. In some aspects, the second resource reservation may include information indicating a priority, such as a QoS and/or 5QI. In some other aspects, the second resource reservation may indicate at least one resource associated with collision indication, such as at least one feedback resource and/or at least one common resource. The at least one resource may be on a feedback channel (e.g., PSFCH) and/or may be on a common channel, groupcast channel, and/or broadcast channel.

For example, referring to FIG. 4, the receiving UE 404 and/or RSC 407 may receive a second resource reservation from one of the transmitting UEs 406, 408. Referring to FIG. 5, the device C 514 may receive a resource reservation from device B 512. Referring to FIG. 7, the receiving device 704 may receive the resource reservation 705 from the second transmitting device 706.

At 806, the receiving UE may identify a collision between first resources reserved by the first transmitting device and second resources reserved by the second transmitting device. In some aspects, the receiving device may compare a first set of resources reserved by the first resource reservation and a second set of resources reserved by the second resource reservation by, first, comparing the first and second sets of resources and, next, determining that the first and second sets of resources include at least a subset of overlapping resources (e.g., on the same time/frequency resources).

In some other aspects, the receiving device may identify a collision between first resources reserved by the first transmitting device and second resources reserved by the second transmitting device based on respective measurements from the signals received from the two transmitting devices. For example, the receiving device may measure at least one first value (e.g., RSRP, SNR, SINR, RSRQ, etc.) based on signal(s) received from the first transmitting device, and may measure at least one second value (e.g., RSRP, SNR, SINR, RSRQ, etc.) based on signal(s) received from the second transmitting device. The receiving device may compare the at least one first value and at least one second value to determine if a difference between the values for the signals from the two transmitting devices is within a threshold level and/or within a range, such a preconfigured threshold level and/or preconfigured range.

In some further aspects, the receiving device may identify a collision between first resources reserved by the first transmitting device and second resources reserved by the second transmitting device based on a distance between the receiving device and each of the transmitting devices (e.g., the distance between the receiving device and the first transmitting device, as well as the distance between the receiving device and the second transmitting device). In still further aspects, the receiving device may identify a collision between first resources reserved by the first transmitting device and second resources reserved by the second transmitting device based on a distance between the two transmitting devices (e.g., the distance between the first and second transmitting devices). The receiving device may determine distances based on geolocation information associated with each of the receiving device, the first transmitting device, and the second transmitting device.

For example, referring to FIG. 4, the receiving UE 404 and/or RSC 407 may identify a collision between first resources reserved by the transmitting UE 402 and second resources reserved by the transmitting UE 406 or the transmitting UE 408. Referring to FIG. 5, the device C 514 may identify a collision between first resources reserved by the transmitting device A 510 and second resources reserved by the transmitting device B 512. Referring to FIG. 7, the receiving device 704 may make the identification 707 of the potential collision between resources reserved by one of the resource reservations 701, 703 from the first transmitting device 702 and resources reserved by the resource reservation 705 from the second transmitting device 706.

At 808, the receiving device may determine to transmit a collision indication to the first transmitting device or the second transmitting device based on the identified collision. In some aspects, the receiving device may determine a first time (e.g., time of arrival or timestamp) of reception of the first resource reservation from the first transmitting device and may determine a second time (e.g., time of arrival or timestamp) of reception of the second resource reservation from the second transmitting device. The receiving device may determine which of the first time or the second time is earlier, and the receiving device may determine to transmit the collision indication to the second transmitting device based on the second resource reservation being associated with the second time, which is later than the first time with which the first resource reservation is associated.

In some other aspects, the receiving device may receive the first resource reservation from the first transmitting device at a same time (e.g., based on a signal arrival time at the receiving device or based on timestamp) as receiving the second resource reservation from the second transmitting device. The receiving device may determine a respective priority associated with each of the first and second resource reservations (or each of the first and second transmitting devices), and the receiving device may determine to send the collision indication to the first transmitting device or the second transmitting device based, at least in part, on which respective priority is relatively higher between the first resource reservation from the first transmitting device and the second resource reservation from the second transmitting device.

In some further aspects, the receiving device may receive a first resource reservation from the first transmitting device at a same time as receiving a second resource reservation from the second transmitting device, and the first and second transmitting devices (or first and second resource reservations) are associated with the same priority. The receiving device may determine to send the collision indication to the first transmitting device or the second transmitting device based, at least in part, on respective starting RBs and/or respective ending RBs reserved by each of the first and second resource reservations. For example, the receiving device may determine which of the first and second resource reservations reserves an earliest starting RB (or earliest ending RB), and the receiving device may determine to transmit the collision indication to the one of the first or second transmitting devices that reserved an earliest starting RB (or earliest ending RB).

In some additional aspects, the receiving device may receive the first resource reservation from the first transmitting device at a same time as receiving the second resource reservation from the second transmitting device, and the first and second transmitting devices (or first and second resource reservations) have a same priority and a same resource allocation. The receiving device may then determine to send the collision indication to the first transmitting device or the second transmitting device based, at least in part, on first device ID (e.g., UE ID) for the first transmitting device and a second device ID (e.g., UE ID) for the second transmitting device. For example, the receiving device may determine which of the first or second transmitting devices has a relatively lower UE ID.

In still further aspects, the receiving device may receive the first resource reservation from the first transmitting device at a same time as receiving the second resource reservation from the second transmitting device, and the first and second transmitting devices (or first and second resource reservations) have a same priority and a same resource allocation and, further, have a respective device IDs from which the receiving device cannot determine which is lower (e.g., the same device IDs). Accordingly, the receiving device may randomly select the first or second transmitting device to which to transmit the collision indication.

For example, referring to FIG. 4, the receiving UE 404 and/or RSC 407 may determine to transmit a collision indication to one of the transmitting UEs 402, 406, 408. Referring to FIG. 5, the device C 514 may determine to transmit a collision indication to one of device A 510 or device B 512. Referring to FIG. 7, the receiving device 704 may make the determination 709 between the first or the second transmitting device 702, 706 to which to transmit the non-CTS 711.

At 810, the receiving device may transmit the collision indication to the determined one of the first transmitting device or the second transmitting device. In some aspects, the collision indication may include a non-CTS signal. In some other aspects, the receiving device may transmit the collision indication on a feedback channel (e.g., PSFCH). In still further aspects, the receiving device may transmit the collision indication on at least one resource (e.g., at least one common resource) that is indicated by the determined one of the first transmitting device or the second transmitting device (e.g., in the respective one of the first resource reservation or second resource reservation).

For example, referring to FIG. 4, the receiving UE 404 and/or RSC 407 may transmit the collision indication to the determined one of the transmitting UEs 402, 406, 408. Referring to FIG. 5, the device C 514 may transmit the collision indication to the determined one of device A 510 or device B 512. Referring to FIG. 7, the receiving device 704 may transmit the non-CTS 711 to the first transmitting device 702 based on the determination 709 of where to transmit the feedback.

At 812, the receiving device may receive a transmission on resources reserved by the one of the first or second resource reservations corresponding to the other one (non-determined one) of the first transmitting device or the second transmitting device. For example, referring to FIG. 4, the receiving UE 404 and/or RSC 407 may receive one of the transmissions 414, 416, 420 from the other (non-determined) one of the transmitting UEs 402, 406, 408. Referring to FIG. 5, the device C 514 may receive one of the transmissions 502, 504 from to the other (non-determined) one of device A 510 or device B 512. Referring to FIG. 7, the receiving device 704 may receive the transmission 715 on the reserved resources from the second transmitting device 706.

Figure 9:
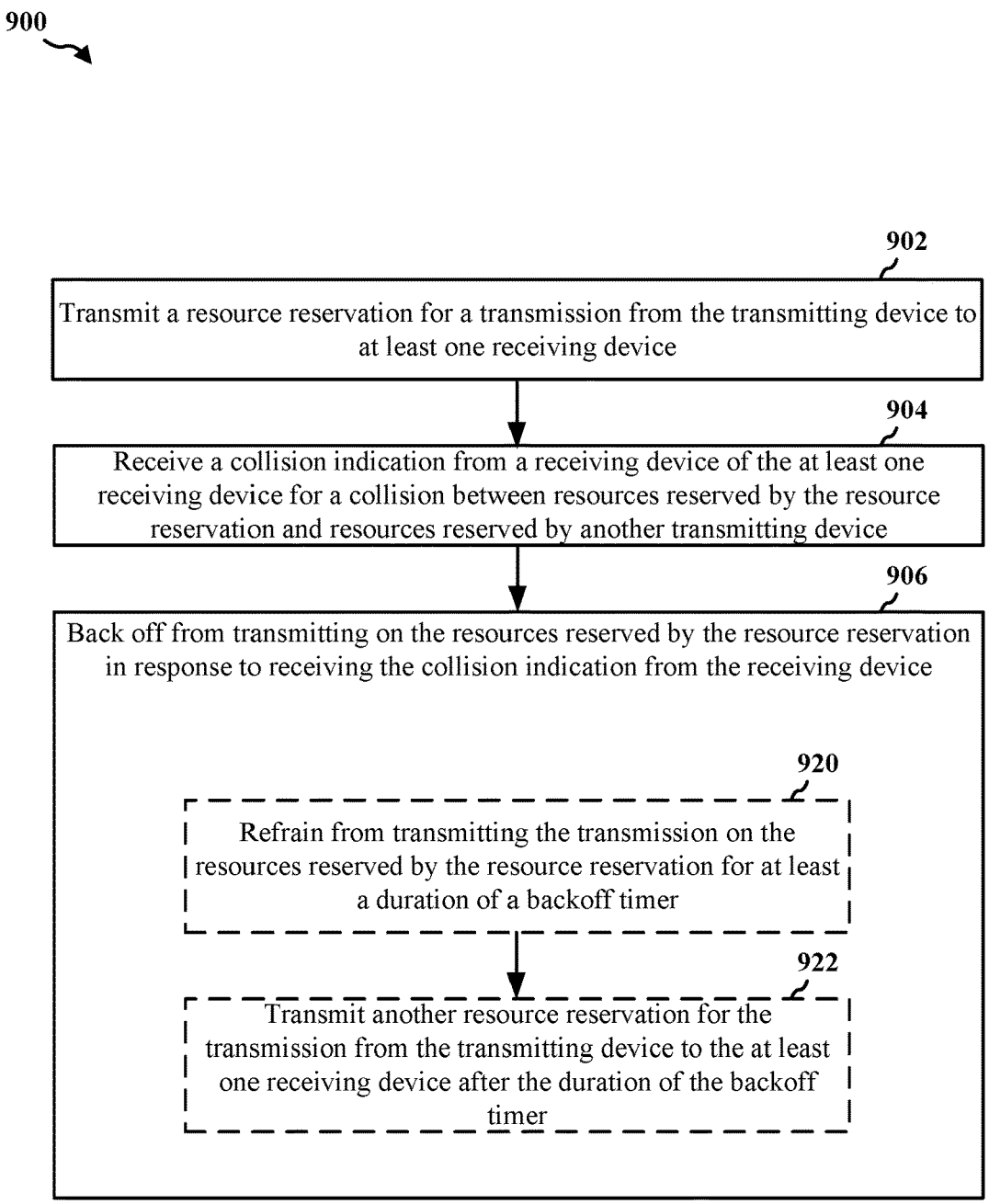
FIG. 9 is a flowchart of a method of wireless communication by a transmitting device.

FIG. 9 is a flowchart of a method 900 of wireless communication. The method 900 may be performed by a UE, transmitting device, and/or other apparatus (e.g., UE 104', 104", 350, 402, 406, 408; transmitting device 510, 512, 702, 706; RSC 107, 407; apparatus 1102). According to various aspects, one or more of the illustrated operations may be omitted, transposed, and/or contemporaneously performed.

At 902, the transmitting device may transmit a resource reservation for a transmission from the transmitting device to at least one receiving device. In some aspects, the resource reservation may include information indicating a priority, such as a QoS and/or 5QI. In some other aspects, the resource reservation may indicate at least one resource associated with collision indication, such as at least one feedback resource and/or at least one common resource. The at least one resource may be on a feedback channel (e.g., PSFCH) and/or may be on a common channel, groupcast channel, and/or broadcast channel.

For example, referring to FIG. 4, the transmitting UE 402 may transmit a resource reservation to the receiving UE 404 and/or RSC 407. Referring to FIG. 5, the device A 510 may transmit a resource reservation to device C 514. Referring to FIG. 7, the first transmitting device 702 may transmit the first and/or second resource reservation(s) 701, 703 to the receiving device 704.

At 904, the transmitting device may receive a collision indication from a receiving device of the at least one receiving device for a collision between resources reserved by the resource reservation and resources reserved by another transmitting device. The transmitting device may receive the collision indication in a collision indication resource reserved by the transmitting device for the collision indication. The transmitting device may indicate the collision indication resource in the resource reservation. The transmitting device may receive the collision indication on a feedback channel (e.g., PSFCH), a common channel, a groupcast channel, and/or broadcast channel. The collision indication may include a feedback sequence for a non-CTS indication.

For example, referring to FIG. 4, the transmitting UE 402 may receive a collision indication from the receiving UE 404 and/or RSC 407. Referring to FIG. 5, the device A 510 may receive a collision indication from the device C 514. Referring to FIG. 7, the first transmitting device 702 may receive the non-CTS 711 from the receiving device 704.

At 906, the transmitting device backs off from transmitting during the resources reserved by the resource reservation in response to receiving the collision indication from the receiving device. For example, the transmitting device may refrain from transmitting on the resources reserved by the resource reservation in response to receiving the collision indication from the receiving device, or the transmitting device may reduce a transmission power. Illustratively, the transmitting device may determine a time period (e.g., based on a timer that is started in response to receiving the collision indication) to refrain from transmitting during the resources reserved by the resource reservation in response to receiving the collision indication from the receiving device, and the transmitting device may refrain from transmitting during the resources reserved by the resource reservation for the duration of the time period. After the time period, the transmitting device may determine whether the resources earlier reserved by the resource reservation are now clear (e.g., no interfering transmissions are detected), and the transmitting device may transmit. In another illustration, the transmitting device may determine an amount by which to reduce a transmission power, and the transmitting device may then transmit during the resources reserved by the resource reservation with the reduced transmission power.

For example, referring to FIG. 4, the transmitting UE 402 may back off from transmission 414 on resources reserved by the resource reservation. Referring to FIG. 5, the device A 510 may back off the transmission 502. Referring to FIG. 7, the first transmitting device 702 may refrain from transmitting on resources reserved by the first or second resource reservations 701, 703 in response to receiving the non-CTS 711 from the receiving device 704.

In some aspects, the transmitting device may back off from transmitting during the resources reserved by the resource reservation by refraining from transmitting the transmission on the resources reserved by the resource reservation for at least a duration of a backoff timer, as shown at 920. For example, the transmitting device may begin a backoff timer (e.g., countdown timer) in response to receiving the collision indication.

For example, referring to FIG. 4, the transmitting UE 402 may refrain from transmitting the transmission 414 on the resources reserved by the resource reservation for at least a duration of a backoff timer. Referring to FIG. 5, the device A 510 may refrain from transmitting the transmission 502 on the resources reserved by the resource reservation for at least a duration of a backoff timer. Referring to FIG. 7, the first transmitting device 702 may refrain from transmitting on resources reserved by the first or second resource reservations 701, 703 in response to receiving the non-CTS 711 from the receiving device 704.

When the backoff timer expires (or counts up to a predetermined time), then, at 922, the transmitting device may transmit another resource reservation for the transmission from the transmitting device. For example, referring to FIG. 4, the transmitting UE 402 may transmit another resource reservation for the transmission 414 after the duration of the backoff timer. Referring to FIG. 5, the device A 510 may refrain from transmitting the transmission 502 on the resources reserved by the resource reservation for at least a duration of a backoff timer. Referring to FIG. 7, the first transmitting device 702 may refrain from transmitting on resources reserved by the first or second resource reservations 701, 703 in response to receiving the non-CTS 711 from the receiving device 704.

Figure 10:
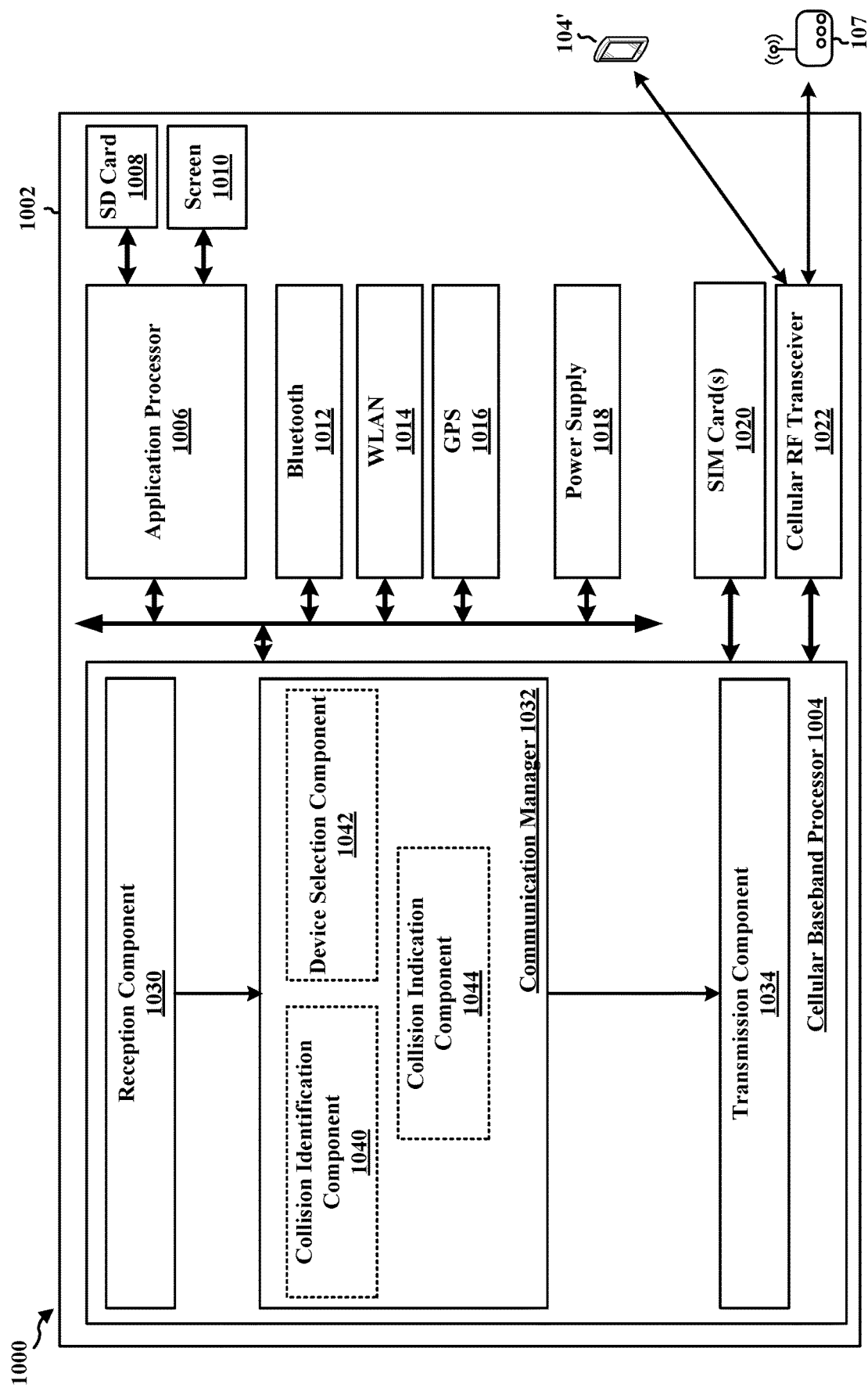
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE (e.g., the UE 104) and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104', RSC 107, and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The reception component 1030 may be configured to receive a first resource reservation from a transmitting UE 104', e.g., as described in connection with 802 of FIG. 8. The reception component 1030 may be further configured to receive a second resource reservation from a transmitting RSC 107, e.g., as described in connection with 804 of FIG. 8. The reception component 1030 may provide input(s) to a collision identification component 1040 based on the first resource reservation and the second resource reservation.

The communication manager 1032 includes a collision identification component 1040 that is configured to identify a collision between first resources reserved by the transmitting UE 104' and second resources reserved by the RSC 107, e.g., as described in connection with 806 of FIG. 8. The communication manager 1032 further includes a device selection component 1042 that receives input(s) based on the identified collision from the collision identification component 1040 and is configured to determine to transmit a collision indication to the transmitting UE 104' or the RSC 107 based on the identified collision, e.g., as described in connection with 808 of FIG. 8.

The communication manager 1032 further includes a collision indication component 1044 that receives input(s) based on the determined one of the transmitting UE 104' or the RSC 107 from the device selection component 1042. The collision indication component 1044 is configured to generate a collision indication for transmission to the determined one of the transmitting UE 104' or the RSC 107, e.g., as described in connection with 810 of FIG. 8.

Further, the reception component 1030 may be configured to receive a transmission on the resources reserved by the other (non-determined) one of the transmitting UE 104' or the RSC 107.

The apparatus may include additional components that perform each of the blocks of the algorithm in the aforementioned call flow diagram of FIG. 7 and/or flowchart of FIG. 8. As such, each block in the aforementioned call flow diagram of FIG. 7 and/or flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for identifying a collision between first resources reserved by a first transmitting device and second resources reserved by a second transmitting device; and means for transmitting a collision indication to the first transmitting device or the second transmitting device based on the identified collision.

In one aspect, the identification of the collision is based on an overlap between the first resources and the second resources. In one aspect, the identification of the collision is further based on a difference in a measured RSRP for a first signal indicating the first resources reserved by the first transmitting device and a second signal indicating the second resources reserved by the second transmitting device.

In one aspect, the identification of the collision is further based on a distance between the receiving device and the first transmitting device and the second transmitting device or between the first transmitting device and the second transmitting device.

In one aspect, the apparatus 1002, and in particular the cellular baseband processor 1004, may include means for receiving a first resource reservation from the first transmitting device; and means for receiving a second resource reservation from the second transmitting device after receiving the first resource reservation, and the transmission of the collision indication is to the second transmitting device based on the second resource reservation being received after the first resource reservation.

In one aspect, the apparatus 1002, and in particular the cellular baseband processor 1004, may include means for receiving a first resource reservation from the first transmitting device at a same time as receiving a second resource reservation from the second transmitting device; and means for determining to transmit the collision indication to the first transmitting device or the second transmitting device based, at least in part, on a first priority of communication associated with the first transmitting device and a second priority of communication associated with the second transmitting device.

In one aspect, the apparatus 1002, and in particular the cellular baseband processor 1004, may include means for receiving a first resource reservation from the first transmitting device at a same time as receiving a second resource reservation from the second transmitting device, and the first transmitting device and the second transmitting device have a same priority; and means for determining to transmit the collision indication to the first transmitting device or the second transmitting device based, at least in part, on a starting RB for the first resources and a starting RB for the second resources.

In one aspect, the apparatus 1002, and in particular the cellular baseband processor 1004, may include means for receiving a first resource reservation from the first transmitting device at a same time as receiving a second resource reservation from the second transmitting device, and the first transmitting device and the second transmitting device have a same priority; and means for determining to transmit the collision indication to the first transmitting device or the second transmitting device based, at least in part, on an ending RB for the first resources and an ending RB for the second resources.

In one aspect, the apparatus 1002, and in particular the cellular baseband processor 1004, may include means for receiving a first resource reservation from the first transmitting device at a same time as receiving a second resource reservation from the second transmitting device, and the first transmitting device and the second transmitting device have a same priority and a same resource allocation; and means for determining to transmit the collision indication to the first transmitting device or the second transmitting device based, at least in part, on first device ID for the first transmitting device and a second device ID for the second transmitting device.

In one aspect, the apparatus 1002, and in particular the cellular baseband processor 1004, may include means for receiving a first resource reservation from the first transmitting device at a same time as receiving a second resource reservation from the second transmitting device, and the first transmitting device and the second transmitting device have a same priority, has a same resource allocation, and are associated with a same set of bits for a device ID; and means for randomly determining to transmit the collision indication to the first transmitting device or the second transmitting device.

In one aspect, the collision indication is transmitted on a resource reserved for the collision indication by the first transmitting device or the second transmitting device.

In one aspect, the apparatus 1002, and in particular the cellular baseband processor 1004, may include means for receiving a first resource reservation from the first transmitting device having an associated first collision indication resource; and means for receiving a second resource reservation from the second transmitting device after receiving the first resource reservation having a second collision indication resource, and the collision indication is transmitted using the associated first collision indication resource or the associated second collision indication resource.

In one aspect, the collision indication is transmitted on a feedback channel. In one aspect, the collision indication comprises a feedback sequence for a non-CTS indication.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
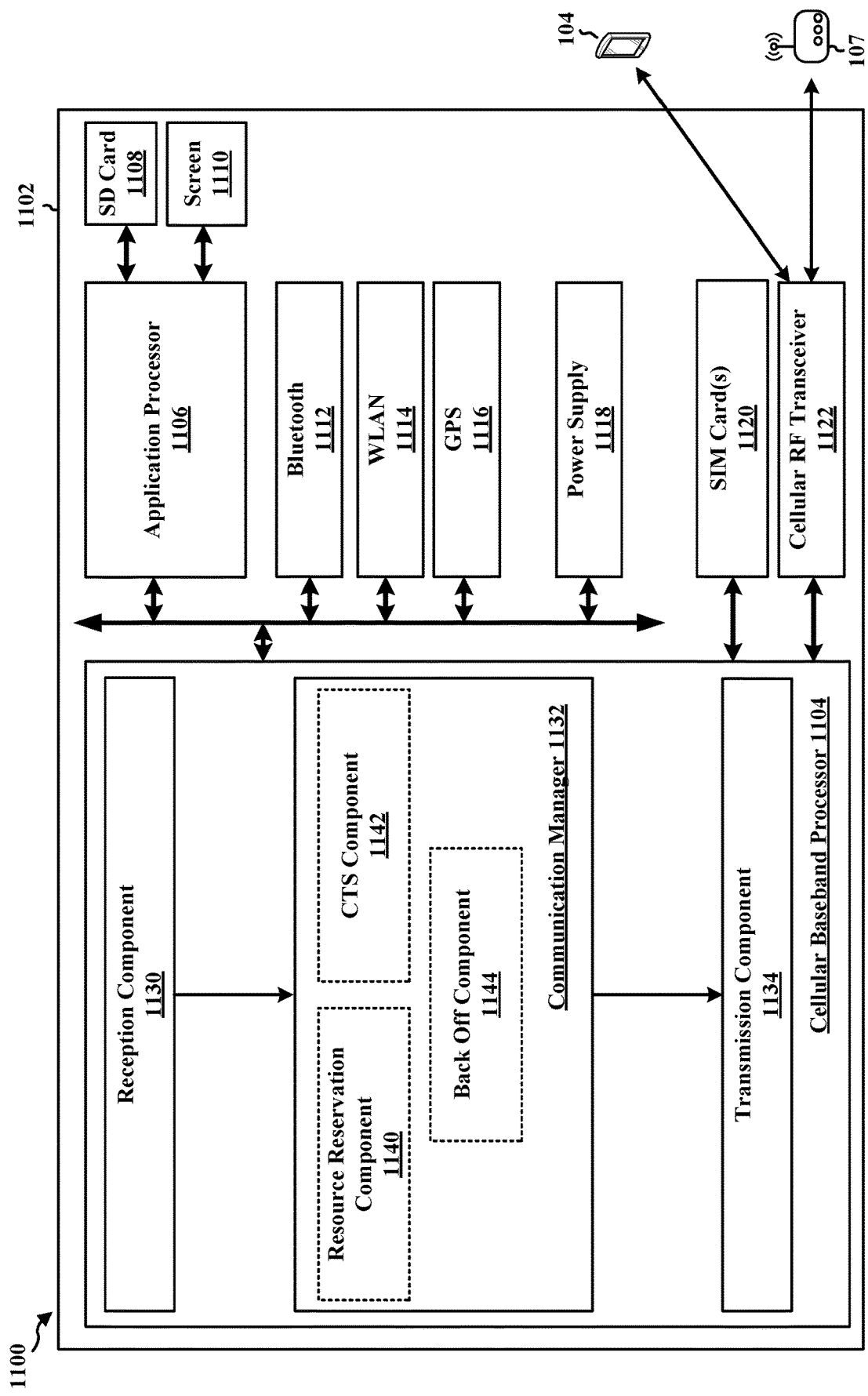
FIG. 11 is a diagram illustrating another example of a hardware implementation for another example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104, RSC 107, and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a resource reservation component 1140 that is configured to generate a resource reservation for a transmission to the receiving UE 104 and/or RSC 107. The transmission component 1034 may transmit the resource reservation for a transmission to the receiving UE 104 and/or RSC 107, e.g., as described in connection with 902 of FIG. 9. The communication manager 1132 further includes a CTS component 1142 that receives input(s) from the reception component 1130 and is configured to receive a collision indication from at least one of the receiving UE 104 and/or RSC 107 for a collision between resources reserved by the resource reservation and resources reserved by another transmitting device, e.g., as described in connection with 904 of FIG. 9. The communication manager 1132 further includes a back off component 1144 that receives input(s) based on the collision indication from the CTS component 1142 and is configured to back off from transmitting on the resources reserved by the resource reservation in response to receiving the collision indication from at least one of the receiving UE 104 and/or RSC 107, e.g., as described in connection with 906 of FIG. 9.

The back off component 1144 may be further configured to refrain from transmitting the transmission on the resources reserved by the resource reservation for at least a duration of a backoff timer, e.g., as described in connection with 920 of FIG. 9. The back off component 1144 may provide input(s) to the resource reservation component 1140, and the resource reservation component 1140 may be configured to generate another resource reservation for the transmission to at least one of the receiving UE 104 and/or RSC 107 after the duration of the backoff timer. The transmission component 1134 may transmit the resource reservation for the transmission to at least one of the receiving UE 104 and/or RSC 107 after the duration of the backoff timer, e.g., as described in connection with 922 of FIG. 9.

The apparatus may include additional components that perform each of the blocks of the algorithm in the aforementioned call flow diagram of FIG. 7 and/or flowchart of FIG. 9. As such, each block in the aforementioned call flow diagram of FIG. 7 and/or flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for transmitting a resource reservation for a transmission from the transmitting device to at least one receiving device; means for receiving a collision indication from a receiving device of the at least one receiving device for a collision between resources reserved by the resource reservation and resources reserved by another transmitting device; and means for backing off from transmitting on the resources reserved by the resource reservation in response to receiving the collision indication from the receiving device.

In one aspect, the collision indication is received on a collision indication resource reserved for the collision indication. In one aspect, the resource reservation includes the collision indication resource. In one aspect, the collision indication is received on a feedback channel. In one aspect, the collision indication includes a feedback sequence for a non-CTS indication.

In one aspect, the means for backing off from transmitting on the resources reserved by the resource reservation is configured to refrain from transmitting the transmission on the resources reserved by the resource reservation for at least a duration of a backoff timer; and transmit another resource reservation for the transmission to the at least one receiving device after the duration of the backoff timer.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a receiving device configured to identify a collision between first resources reserved by a first transmitting device and second resources reserved by a second transmitting device; and transmit a collision indication to the first transmitting device or the second transmitting device based on the identified collision.

Example 2 is the receiving device of example 1, and the identification of the collision is based on an overlap between the first resources and the second resources.

Example 3 is the receiving device of example 2, and the identification of the collision is further based on a difference in a measured RSRP for a first signal indicating the first resources reserved by the first transmitting device and a second signal indicating the second resources reserved by the second transmitting device.

Example 4 is the receiving device of any of examples 2 through 3, and the identification of the collision is further based on a distance between the receiving device and the first transmitting device and the second transmitting device or between the first transmitting device and the second transmitting device.

Example 5 is the receiving device of any of examples 1 through 4, and the receiving device is further configured to receive a first resource reservation from the first transmitting device; and receive a second resource reservation from the second transmitting device after receiving the first resource reservation, and the transmission of the collision indication is to the second transmitting device based on the second resource reservation being received after the first resource reservation.

Example 6 is the receiving device of any of examples 1 through 4, and the receiving device is further configured to receive a first resource reservation from the first transmitting device at a same time as receiving a second resource reservation from the second transmitting device; and determine to transmit the collision indication to the first transmitting device or the second transmitting device based, at least in part, on a first priority of communication associated with the first transmitting device and a second priority of communication associated with the second transmitting device.

Example 7 is the receiving device of any of examples 1 through 4, and the receiving device is further configured to receive a first resource reservation from the first transmitting device at a same time as receiving a second resource reservation from the second transmitting device, and the first transmitting device and the second transmitting device have a same priority; and determine to transmit the collision indication to the first transmitting device or the second transmitting device based, at least in part, on a starting resource block for the first resources and a starting RB for the second resources.

Example 8 is the receiving device of any of examples 1 through 4, and the receiving device is further configured to receive a first resource reservation from the first transmitting device at a same time as receiving a second resource reservation from the second transmitting device, and the first transmitting device and the second transmitting device have a same priority; and determine to transmit the collision indication to the first transmitting device or the second transmitting device based, at least in part, on an ending resource block for the first resources and an ending RB for the second resources.

Example 9 is the receiving device of any of examples 1 through 4, and the receiving device is further configured to receive a first resource reservation from the first transmitting device at a same time as receiving a second resource reservation from the second transmitting device, and the first transmitting device and the second transmitting device have a same priority and a same resource allocation; and determine to transmit the collision indication to the first transmitting device or the second transmitting device based, at least in part, on first device ID for the first transmitting device and a second device ID for the second transmitting device.

Example 10 is the receiving device of any of examples 1 through 4, and the receiving device is further configured to receive a first resource reservation from the first transmitting device at a same time as receiving a second resource reservation from the second transmitting device, and the first transmitting device and the second transmitting device have a same priority, a same resource allocation, and are associated with a same set of bits for a device ID; and randomly determining to transmit the collision indication to the first transmitting device or the second transmitting device.

Example 11 is the receiving device of any of examples 1 through 10, and the collision indication is transmitted on a resource reserved for the collision indication by the first transmitting device or the second transmitting device.

Example 12 is the receiving device of any of examples 1 through 10, and the receiving device is further configured to receive a first resource reservation from the first transmitting device having an associated first collision indication resource; and receive a second resource reservation from the second transmitting device after receiving the first resource reservation having a second collision indication resource, and the collision indication is transmitted using the associated first collision indication resource or the associated second collision indication resource.

Example 13 is the receiving device of any of examples 1 through 10, and the collision indication is transmitted on a feedback channel.

Example 14 is the receiving device of any of examples 1 through 10 and the collision indication comprises a feedback sequence for a non-CTS indication.

Example 15 is a transmitting device configured to transmit a resource reservation for a transmission from the transmitting device to at least one receiving device; receive a collision indication from a receiving device of the at least one receiving device for a collision between resources reserved by the resource reservation and resources reserved by another transmitting device; and back off from transmitting on the resources reserved by the resource reservation in response to receiving the collision indication from the receiving device.

Example 16 is the transmitting device of example 15, and the collision indication is received on a collision indication resource reserved for the collision indication.

Example 17 is the transmitting device of example 16, and the resource reservation includes the collision indication resource.

Example 18 is the transmitting device of example 15, and the collision indication is received on a feedback channel.

Example 19 is the transmitting device of any of examples 15 through 18, and the collision indication includes a feedback sequence for a non-CTS indication.

Example 20 is transmitting device of any of examples 15 through 19, and the backing off from transmitting on the resources reserved by the resource reservation comprises: refraining from transmitting the transmission on the resources reserved by the resource reservation for at least a duration of a backoff timer; and transmitting another resource reservation for the transmission from the transmitting device to the at least one receiving device after the duration of the backoff timer.

What is claimed is:

1. A method of wireless communication at a receiving device, comprising:
   before identifying a collision between a first set of resources and a second set of resources, receiving a first resource reservation message for scheduling a reservation of the first set of resources for future transmission from a first transmitting device, the first resource reservation message being received on resources different from the first set of resources, and receiving a second resource reservation message for scheduling a reservation of the second set of resources for future transmission from a second transmitting device, the second resource reservation message being received on resources different from the second set of resources;
   identifying the collision between the first set of resources reserved by a first transmitting device and the second set of resources reserved by the second transmitting device based on the received first resource reservation message and the received second resource reservation message; and
   transmitting a collision indication to one of the first transmitting device or the second transmitting device based on the identified collision.

2. The method of claim 1, wherein the identification of the collision is based on an overlap between the first set of resources and the second set of resources.

3. The method of claim 2, wherein the identification of the collision is further based on a difference in a measured reference signal received power (RSRP) for a first signal indicating the first set of resources reserved by the first transmitting device and a second signal indicating the second set of resources reserved by the second transmitting device.

4. The method of claim 2, wherein the identification of the collision is further based on a distance between the receiving device and the first transmitting device and the second transmitting device or between the first transmitting device and the second transmitting device.

5. The method of claim 1, further comprising:
   receiving the first resource reservation message from the first transmitting device; and
   receiving the second resource reservation message from the second transmitting device after receiving the first resource reservation message,
   wherein the transmission of the collision indication is to the second transmitting device based on the second resource reservation message being received after the first resource reservation message.

6. The method of claim 1, further comprising:
   determining to transmit the collision indication to the first transmitting device or the second transmitting device based, at least in part, on a first priority of communication associated with the first transmitting device and a second priority of communication associated with the second transmitting device.

7. The method of claim 1, further comprising:
   receiving the first resource reservation message from the first transmitting device within a same slot as receiving the second resource reservation message from the second transmitting device, wherein the first transmitting device and the second transmitting device have a same priority; and
   determining to transmit the collision indication to the first transmitting device or the second transmitting device based, at least in part, on a starting resource block for the first set of resources and a starting resource block (RB) for the second set of resources.

8. The method of claim 1, further comprising:
   receiving the first resource reservation message from the first transmitting device within a same slot as receiving the second resource reservation message from the second transmitting device, wherein the first transmitting device and the second transmitting device have a same priority; and
   determining to transmit the collision indication to the first transmitting device or the second transmitting device based, at least in part, on an ending resource block for the first set of resources and an ending RB for the second set of resources.

9. The method of claim 1, further comprising:
receiving the first resource reservation message from the first transmitting device within a same slot as receiving the second resource reservation message from the second transmitting device, wherein the first transmitting device and the second transmitting device have a same priority and a same resource allocation; and
determining to transmit the collision indication to the first transmitting device or the second transmitting device based, at least in part, on first device identifier (ID) for the first transmitting device and second device ID for the second transmitting device.

10. The method of claim 1, further comprising:
receiving the first resource reservation message from the first transmitting device within a same slot as receiving the second resource reservation message from the second transmitting device, wherein the first transmitting device and the second transmitting device have a same priority, a same resource allocation, and are associated with a same set of bits for a device identifier (ID); and
randomly determining to transmit the collision indication to the first transmitting device or the second transmitting device.

11. The method of claim 1, wherein the collision indication is transmitted on a resource reserved for the collision indication by the first transmitting device or the second transmitting device.

12. The method of claim 11, further comprising:
receiving the first resource reservation message from the first transmitting device having an associated first collision indication resource; and
receiving the second resource reservation message from the second transmitting device after receiving the first resource reservation message having a second collision indication resource,
wherein the collision indication is transmitted using the associated first collision indication resource or an associated second collision indication resource.

13. The method of claim 1, wherein the collision indication is transmitted on a feedback channel.

14. The method of claim 13, wherein the collision indication comprises a feedback sequence for a non-clear to send (non-CTS) indication.

15. A method of wireless communication at a transmitting device, comprising:
before receiving a collision indication between a first set of resources and a second set of resources from a receiving device of at least one receiving device, transmitting a resource reservation for a transmission from the transmitting device to the at least one receiving device;
receiving the collision indication from the receiving device of the at least one receiving device for a collision between the first set of resources reserved by the resource reservation and the second set of resources reserved by another transmitting device, the collision indication being received on a third set of resources different from the first set of resources and the second set of resources; and
backing off from transmitting on the first set of resources reserved by the resource reservation in response to receiving the collision indication from the receiving device.

16. The method of claim 15, wherein the collision indication is received on a collision indication resource reserved for the collision indication.

17. The method of claim 16, wherein the resource reservation includes the collision indication resource.

18. The method of claim 15, wherein the collision indication is received on a feedback channel.

19. The method of claim 18, wherein the collision indication comprises a feedback sequence for a non-clear to send (non-CTS) indication.

20. The method of claim 15, wherein the backing off from transmitting on the first set of resources reserved by the resource reservation comprises:
refraining from transmitting the transmission on the first set of resources reserved by the resource reservation for at least a duration of a backoff timer; and
transmitting another resource reservation for the transmission from the transmitting device to the at least one receiving device after the duration of the backoff timer.

21. An apparatus for wireless communication by a receiving device, comprising:
a memory; and
at least one processor coupled to the memory and configured to:
before identifying a collision between a first set of resources and a second set of resources, receive a first resource reservation message for scheduling a reservation of the first set of resources for future transmission from a first transmitting device, the first resource reservation message being received on resources different from the first set of resources, and receive a second resource reservation message for scheduling a reservation of the second set of resources for future transmission from a second transmitting device, the second resource reservation message being received on resources different from the second set of resources;
identify the collision between the first set of resources reserved by the first transmitting device and the second set of resources reserved by the second transmitting device based on the received first resource reservation message and the received second resource reservation message; and
transmit a collision indication to one of the first transmitting device or the second transmitting device based on the identified collision.

22. The apparatus of claim 21, wherein the identification of the collision is based on an overlap between the first set of resources and the second set of resources.

23. The apparatus of claim 22, wherein the identification of the collision is further based on a difference in a measured reference signal received power (RSRP) for a first signal indicating the first set of resources reserved by the first transmitting device and a second signal indicating the second set of resources reserved by the second transmitting device.

24. The apparatus of claim 22, wherein the identification of the collision is further based on a distance between the receiving device and the first transmitting device and the second transmitting device or between the first transmitting device and the second transmitting device.

25. The apparatus of claim 21, wherein the collision indication is transmitted on a resource reserved for the collision indication by the first transmitting device or the second transmitting device.

26. The apparatus of claim 21, wherein the collision indication is transmitted on a feedback channel, and the collision indication comprises a feedback sequence for a non-clear to send (non-CTS) indication.

27. An apparatus for wireless communication by a transmitting device, comprising:
- a memory; and
- at least one processor coupled to the memory and configured to:
  - before receiving a collision indication between a first set of resources and a second set of resources from a receiving device of at least one receiving device, transmit a resource reservation for a transmission from the transmitting device to the at least one receiving device;
  - receive the collision indication from the receiving device of the at least one receiving device for a collision between the first set of resources reserved by the resource reservation and the second set of resources reserved by another transmitting device, the collision indication being received on a third set of resources different from the first set of resources and the second set of resources; and
  - back off from transmitting on the first set of resources reserved by the resource reservation in response to receiving the collision indication from the receiving device.

28. The apparatus of claim 27, wherein the collision indication is received on a collision indication resource reserved for the collision indication.

29. The apparatus of claim 28, wherein the resource reservation includes the collision indication resource.

30. The apparatus of claim 27, wherein the collision indication is received on a feedback channel.

31. The apparatus of claim 21, wherein the collision indication is transmitted to the first transmitting device or the second transmitting device based, at least in part, on a first priority of communication associated with the first transmitting device and a second priority of communication associated with the second transmitting device.

32. The apparatus of claim 21, wherein the collision indication is transmitted on a resource reserved for the collision indication by the first transmitting device or the second transmitting device.

33. The apparatus of claim 21, wherein the collision indication is transmitted on a feedback channel.

34. The method of claim 1, wherein the receiving device, the first transmitting device, and the second transmitting device each comprise a user equipment (UE), and wherein the collision indication is transmitted in a sidelink communication.

35. The method of claim 15, wherein the transmitting device, the receiving device, and the another transmitting device each comprise a user equipment (UE), and wherein the collision indication is transmitted in a sidelink communication.

36. The apparatus of claim 21, wherein the receiving device, the first transmitting device, and the second transmitting device each comprise a user equipment (UE), and wherein the collision indication is transmitted in a sidelink communication.

37. The apparatus of claim 27, wherein the transmitting device, the receiving device, and the another transmitting device each comprise a user equipment (UE), and wherein the collision indication is transmitted in a sidelink communication.

* * * * *